F. B. CONVERSE & F. A. KRESS.
MACHINE FOR MAKING TIRE CASINGS.
APPLICATION FILED JULY 26, 1911.
1,114,732.
Patented Oct. 27, 1914.
6 SHEETS—SHEET 1.
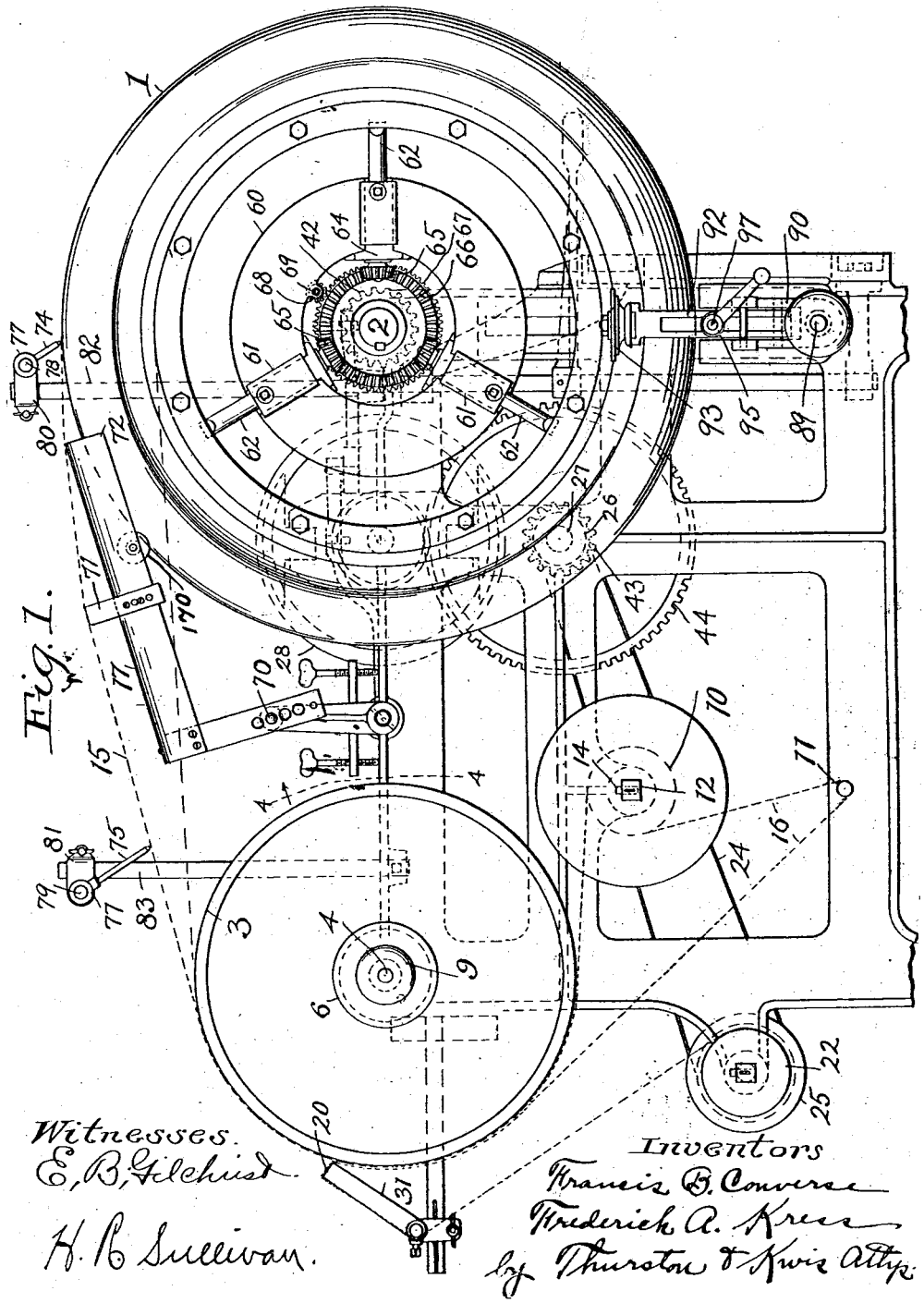

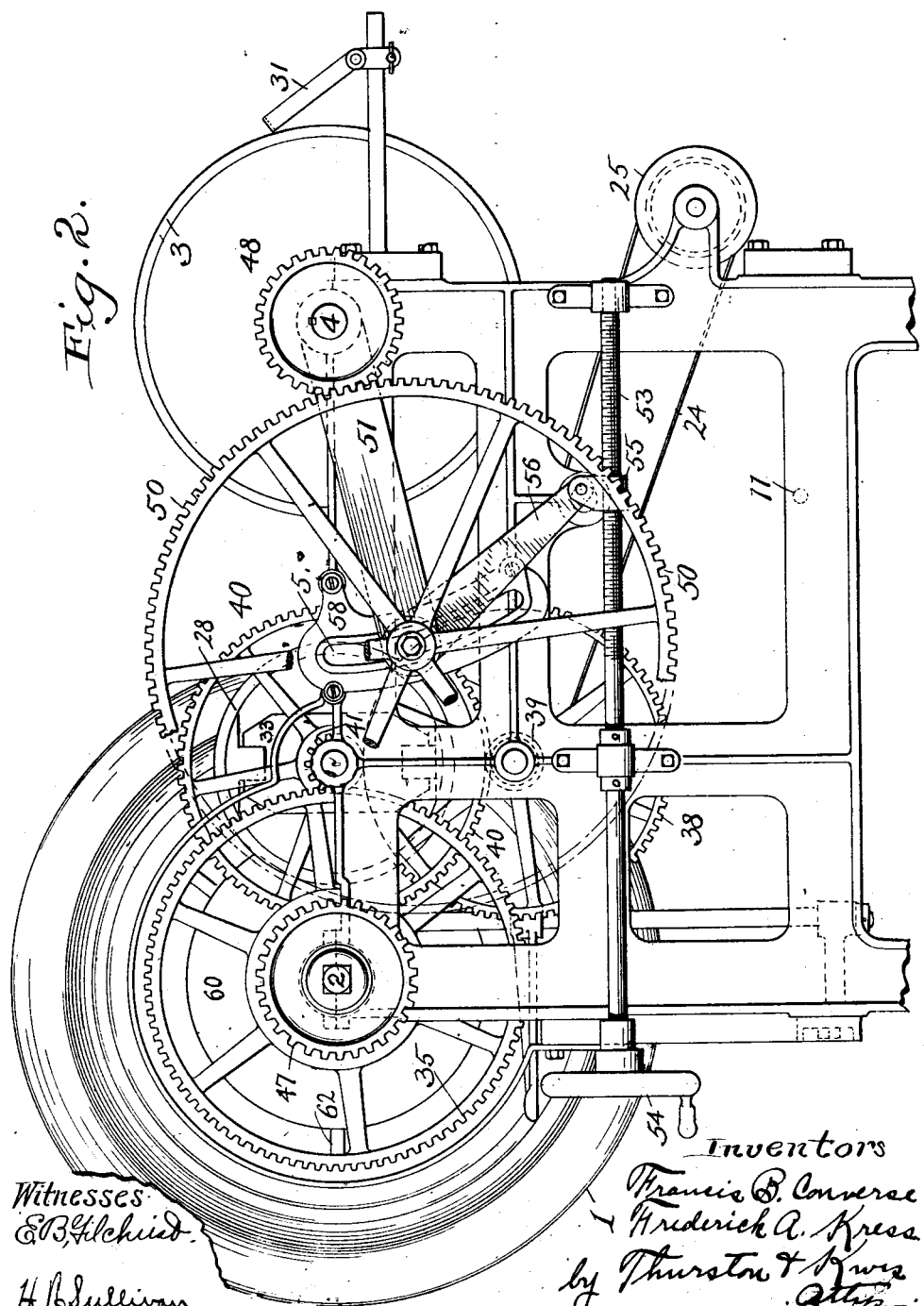

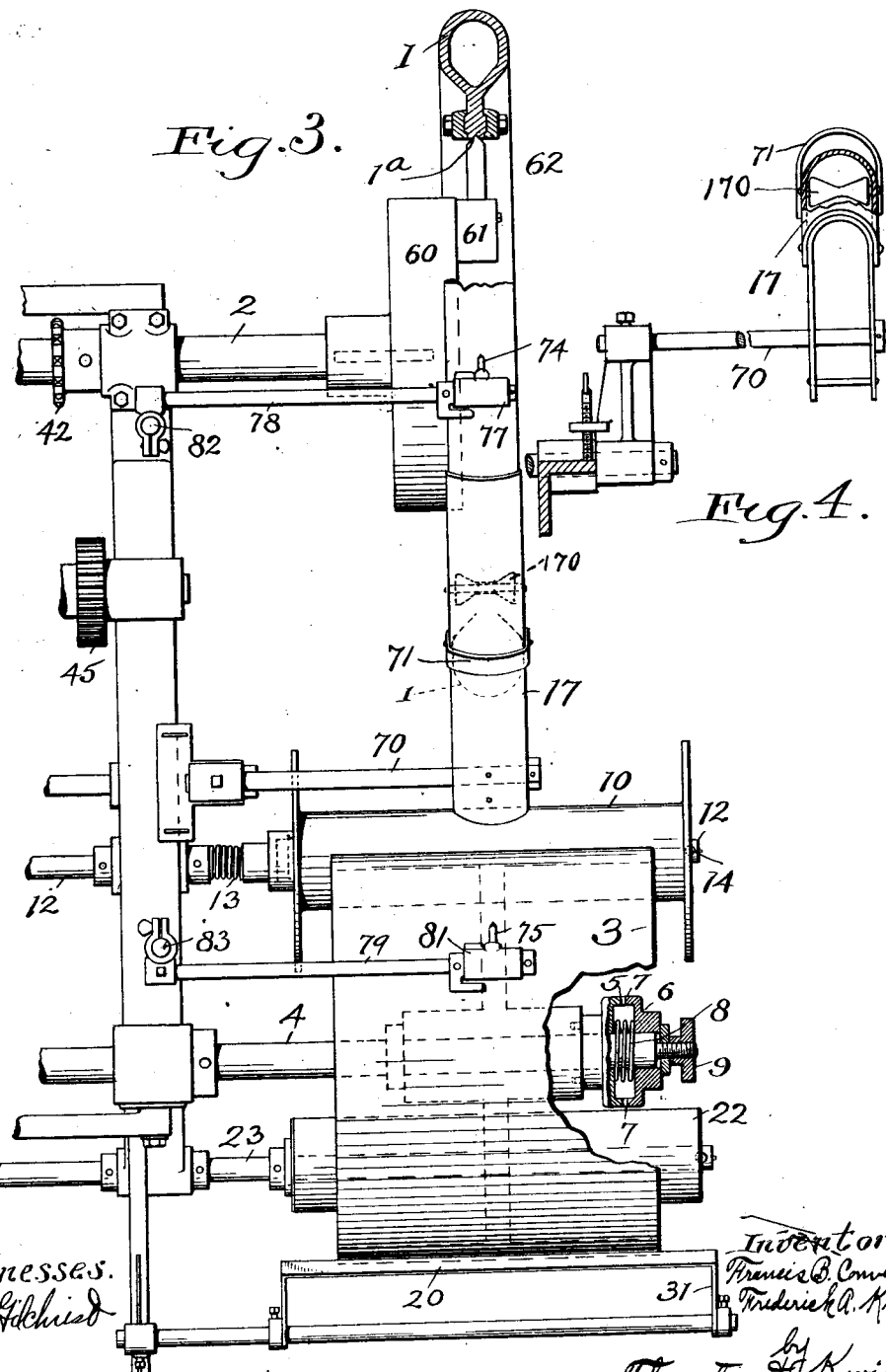

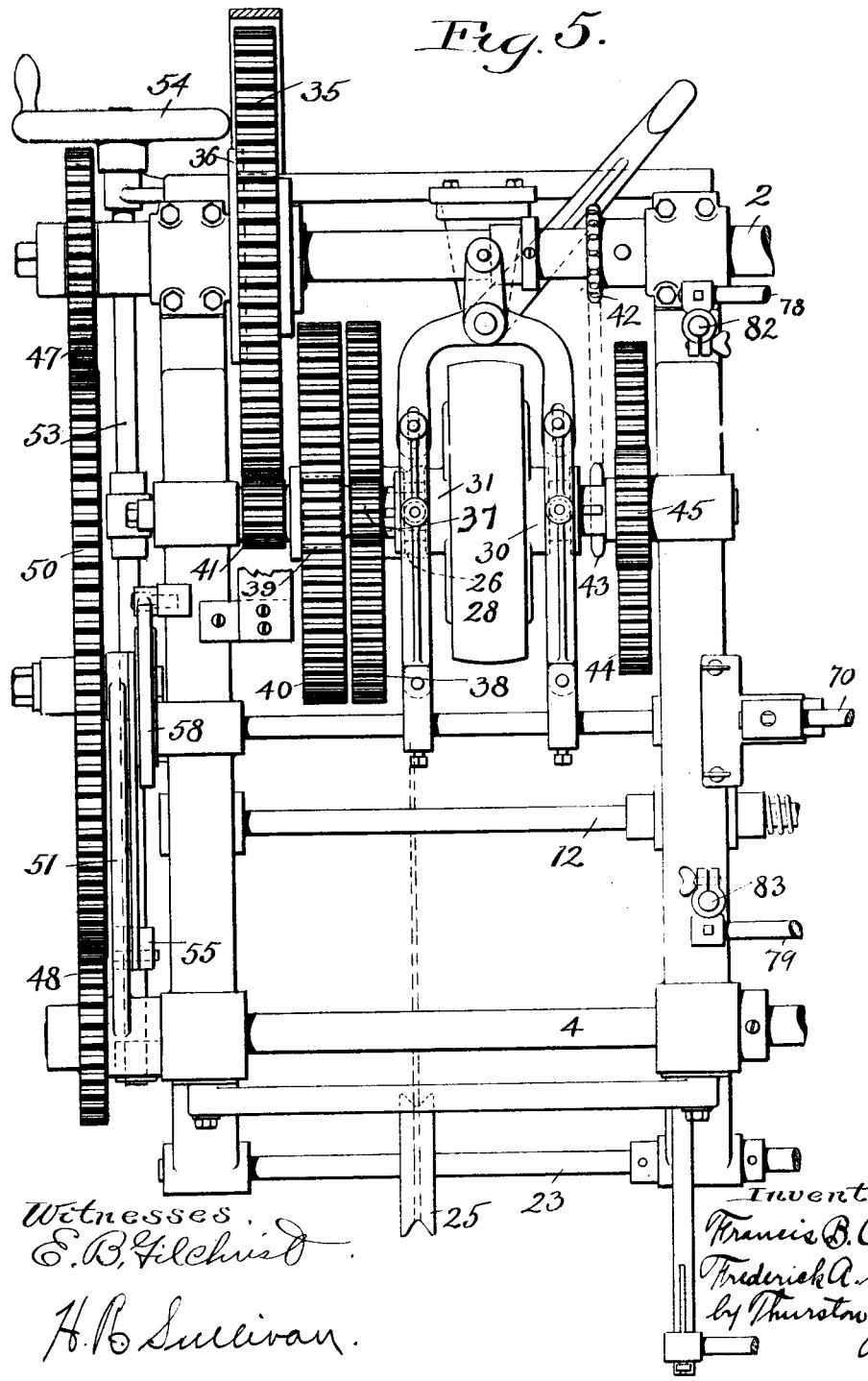

F. B. CONVERSE & F. A. KRESS.
MACHINE FOR MAKING TIRE CASINGS.
APPLICATION FILED JULY 26, 1911.
1,114,732.
Patented Oct. 27, 1914.
6 SHEETS—SHEET 6.
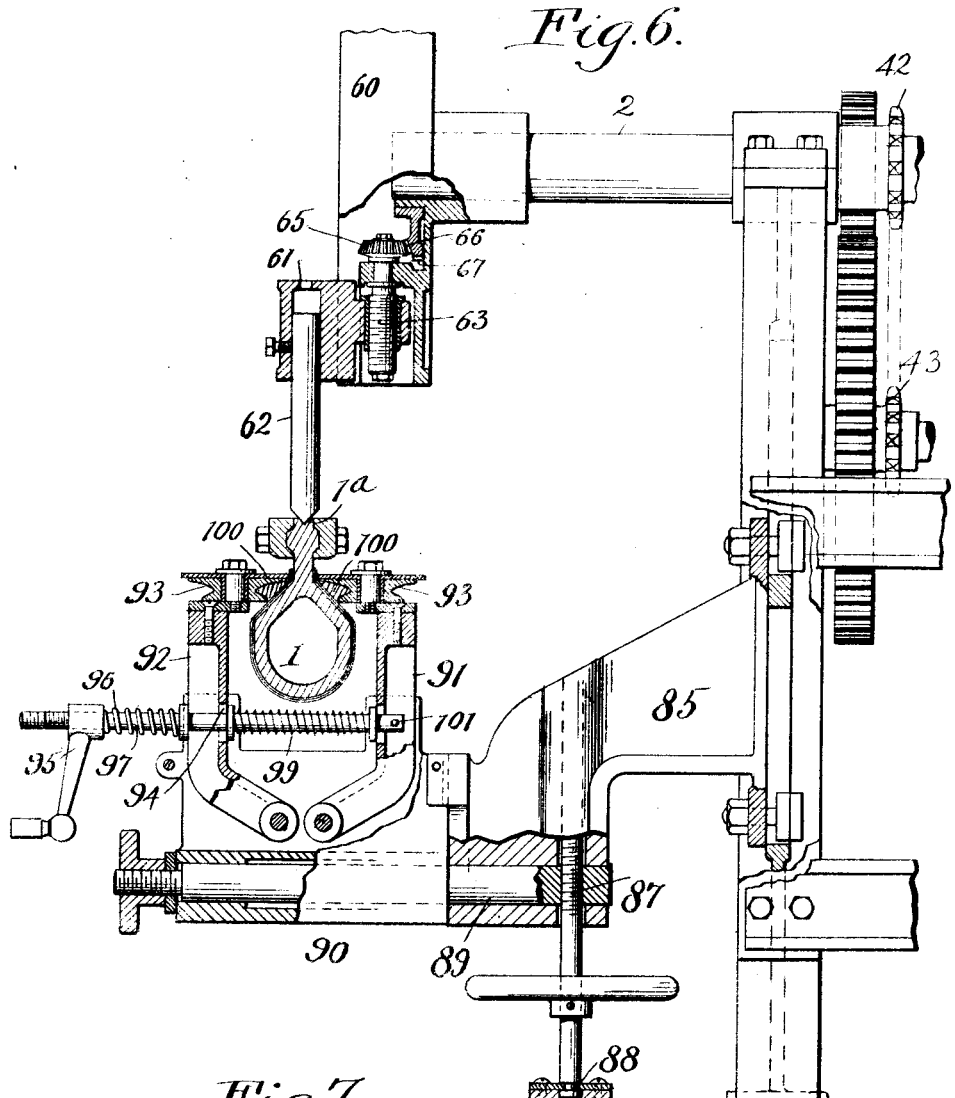
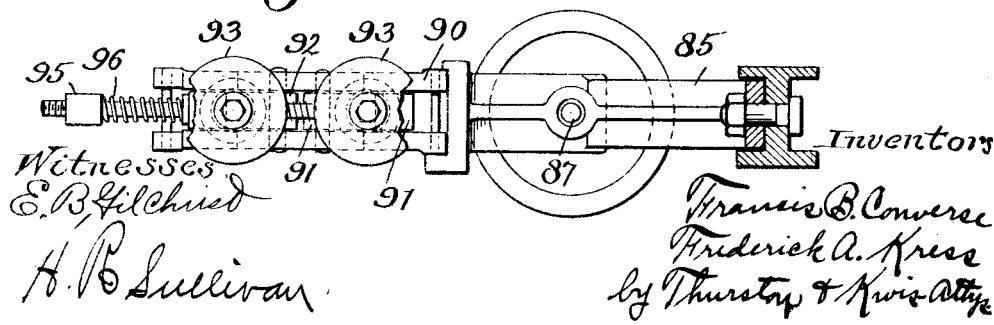

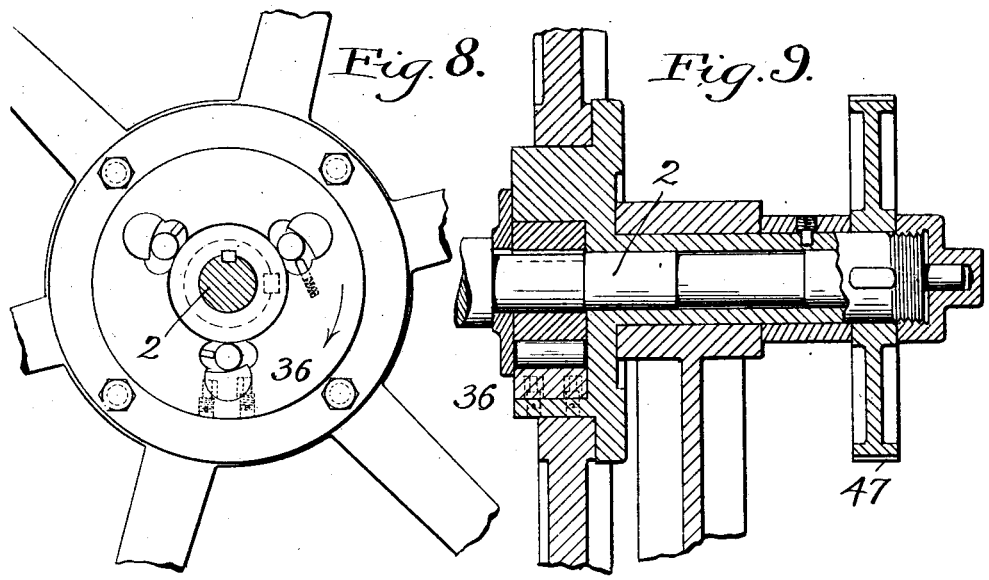
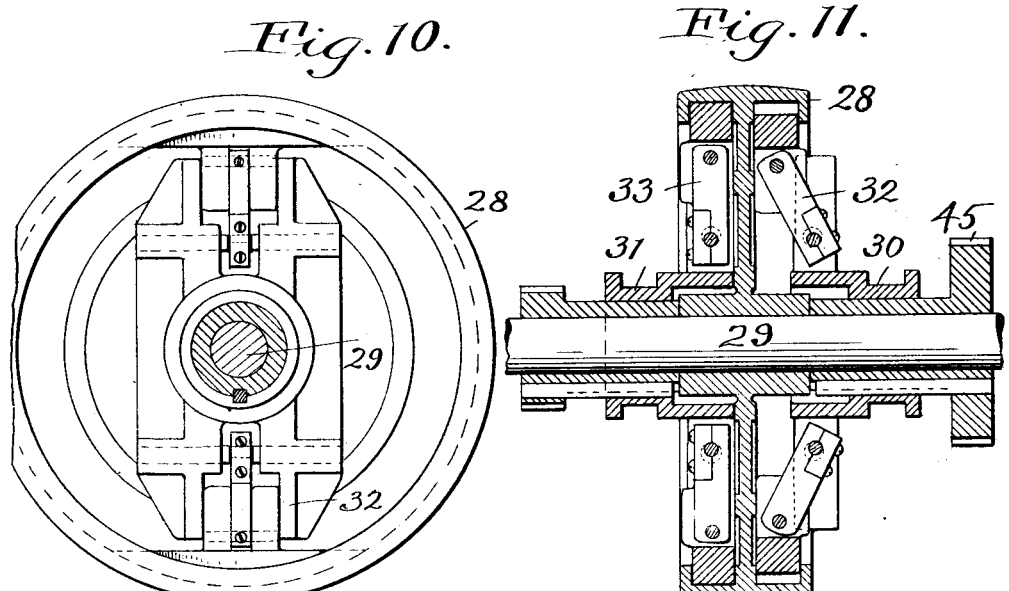

UNITED STATES PATENT OFFICE.

FRANCIS B. CONVERSE AND FREDERICK A. KRESS, OF AKRON, OHIO, ASSIGNORS, BY MESNE ASSIGNMENTS, TO THE B. F. GOODRICH COMPANY, OF NEW YORK, N. Y., A CORPORATION OF NEW YORK.

MACHINE FOR MAKING TIRE-CASINGS.

1,114,732.     Specification of Letters Patent.     Patented Oct. 27, 1914.

Application filed July 26, 1911. Serial No. 640,585.

*To all whom it may concern:*

Be it known that we, FRANCIS B. CONVERSE and FREDERICK A. KRESS, citizens of the United States, and residents of Akron, in the county of Summit and State of Ohio, have invented a certain new and useful Improvement in Machines for Making Tire-Casings, of which the following is a full, clear, and exact description.

This invention relates to improvements in machines for making plural ply pneumatic tire casings.

The object of the invention is to provide a practical machine with which a continuous spliced strip of friction fabric may be wound upon a ring core of any required diameter until a sufficient number of plies have been superposed upon each other, and may be uniformly stretched to a predetermined degree as it is being so applied to the ring core.

The invention is shown in the accompanying drawings as hereinafter fully described and definitely pointed out in the appended claims.

In the drawing, Figure 1 is a front elevation of the machine. Fig. 2 is a rear elevation of the machine. Fig. 3 is a plan view of the front part of the machine. Fig. 4 is a sectional view of the guide and its associated parts, the section being on line 4—4 on Fig. 1. Fig. 5 is a plan view of the rear part of the machine. Fig. 6 is an end view partly sectioned of the front part of the machine. Fig. 7 is a plan view of the mechanism shown in Fig. 6 for applying the beads to a tire casing. Fig. 8 is an end view of the roller ratchet clutch which connects gear with its shaft. Fig. 9 is a longitudinal section of said shaft and connecting mechanism. Fig. 10 is an end view of the driving pulley and the clutch connecting it with the driving shaft. Fig. 11 is a longitudinal section through this driving pulley and the parts to which it may be clutched.

Referring to the parts by reference numerals, 1 represents an annular core, whose external configuration corresponds with the desired internal configuration of the casing to be formed thereon. This core is removably connected with a rotatable shaft 2, by suitable means, such for example, as the means shown in the drawing, which will be hereinafter described in detail.

3 represents a stretcher drum which is carried by a rotatable shaft 4 to which it is generally so connected that when the shaft is turned the stretcher drum must turn with it. It is, however, desirable that the shaft of this drum may be turned independently of said drum at certain times,—and therefore some such means as are shown should preferably be employed to connect the stretcher drum and shaft. The means shown consists of teeth 5 on the hub of the drum, and a collar 6 which is movable lengthwise only on the shaft 4, and has teeth 7 for engagement with the teeth 5. A spring 8 acts to move the sleeve to disengage these teeth, and a nut 9 which screws onto the shaft moves the sleeve in the engaging direction.

We prefer to store upon the stock-wheel 10 hereinafter mentioned, material for several tires, and to revolve the core at times when the drum and fabric are stationary, as for example, when a carcass has been laid and the fabric strip severed, and the core is then revolved to trim the edges of the fabric or roll it down upon the beads. The disengagement of the coupling teeth 5, 7 by relief of the nut 9 under these conditions permits the shafts 2 and 4 to rotate without moving the stretcher drum.

10 represents the reel upon which is wound the fabric strip 15 from which the tire casing is to be made. The reel has an angular hole through it to fit the angular part of the shaft 12 upon which it is removably mounted. A spring 13 thrusts against one end of this reel and an adjacent part of the frame whereby said reel is held over against a spring latch 14 which is carried on the end of the said shaft.

In using the machine for making tire casings a continuous strip 15 of fabric which has been suitably treated with rubber composition is wound upon this reel, together with an interposed liner 16 which is employed merely to keep the successive layers of fabric from sticking together, while on the reel. This liner is commonly made of unbleached muslin. The reel is placed in the machine with the fabric and liner wound upon it. The fabric strip 15 should, as we now believe, be made of pieces of bias-cut fabric spliced together to form a continuous strip of the required length. This strip will generally be made of what is known as friction fabric, and have a skim coating of unvulcanized rubber compound on one (the outer) surface. In fact, so much of the strip as forms the first or inner layer or ply on the core should have this skim coating on both surfaces. The bias cut strip 15 of friction fabric goes from the reel 10 to and partly around the stretcher drum 3 and thence over a former 17 to the ring core 1 upon which the end of the fabric is pressed so as to cause it to stick. The core is then turned by hand a definite distance in order to stretch to the required degree the length of fabric between the stretcher drum and the core. Then the ring core is positively rotated with the result of winding the fabric thereon. The ring core and stretcher drum are rotated by means to be described at such rates that the surface speed of the ring core is about fifteen per cent. greater than the surface speed of the stretcher drum. Therefore, the fabric will be stretched as it passes from the stretching drum to the ring core to the required degree. It will be understood, of course, that it is the longitudinal central part of the strip only which is stretched to the degree stated. The sides of this strip will be "stitched" down against the sides of the ring core, or against the underlying layers, as the case may be, by workmen properly stationed and employing suitable tools which may be substantially such as have heretofore been employed for stitching down the sides of strips applied by hand to rotatable cores, or these tools may be attached to the machine and brought into action at appropriate stages as will be evident to those skilled in the art. The liner strip 16 comes off the reel with the fabric strip 15; and in order to separate this liner strip from the fabric strip, and properly reel it up for future use, the liner strip is carried down and under a rod or roller 11, whereby it is separated from the fabric strip, thence upward and again into contact with a part of the fabric strip which is on the stretcher drum; thence over the top bar 20 of a freely swinging frame 31, and down to a reel 22 which is removably fixed upon a shaft 23. This shaft is turned by means of a small loose belt 24 which runs over a sheave pulley 25 on shaft 23 and over another sheave pulley 26 on a rotating shaft 27. The speed of the reel 22 is normally such that, if it were unimpeded, it would draw the liner strip along faster than the stretcher roll draws the fabric strip I. To prevent this action and its attendant disadvantages, the liner strip, after being completely separated from the fabric strip, goes, as stated, upward into contact with a part of the fabric strip on the stretcher drum. It sticks to this just enough to compel the two strips to move in unison. This puts a drag on the rotation of the reel 22 so as to cause the belt 24 to slip a little, wherefore said reel will turn just fast enough to wind up the liner strip at the same rate that the fabric strip is being drawn along by the stretcher drum.

The power to drive the different parts of the machine comes from a positively driven belt pulley 28 which is loosely mounted on a non-rotatable shaft 29 between two sleeves 30 and 31 which are also rotatably mounted upon this same shaft 29. Clutch mechanisms 32 and 33 of any suitable form are employed to connect either of these sleeves at will with the driving pulley. Figs. 10 and 11 show such clutch mechanism in a form so familiar that it is thought no further description will be necessary. Any suitable clutch mechanism may be employed in place of that which is so shown.

Upon the shaft 2 which carries the ring core a gear 35 is mounted, and between the shaft and gear is a familiar form of roller ratchet clutch 36 which permits the gear and shaft to turn relatively in one direction, but does not permit them to so turn in the other direction, but instead compels them to rotate together. This clutch is shown in detail in Figs. 8 and 9, but is of so well known a form that further description is thought unnecessary.

The sleeve 31 has a pinion 37 fixed to it, and between this pinion and the gear 35 is a train of reducing gearing which includes, in the following order, the gears 38, 39, 40 and 41,—the first of these series meshing with the pinion 37, and the last meshing with the gear 35. It is through this train of mechanism that the ring core is turned slowly, while the fabric strip is being wound thereupon. It is desirable, however, that the ring core shaft may be turned rapidly and independently of the stretcher drum; first to facilitate the cleaning of the surface of the ring core preparatory to winding a fabric strip thereon; and later, to finally finish the stitching of the strip down upon the core after it has all been wound thereon. To enable this a sprocket wheel 42 is fixed to the ring core shaft, and another sprocket wheel 43 is fixed to a gear 44 which meshes with a smaller gear 45 fixed to the sleeve 30.

To cause the ring core shaft to be driven through this latter train of mechanism the driving pulley is unclutched from the sleeve 31 and clutched to the sleeve 30. While the ring core shaft is being rapidly driven through this train of mechanism, said shaft turns freely in the gear 35, which does not turn.

Removably secured upon the inner or driven member of the roller ratchet clutch is the change gear 47 and on the shaft 4 of the stretcher drum is secured a gear 48. Meshing with these two gears is the large intermediate gear 50. These three gears must be such size relatively that the stretcher drum shaft will be driven at the proper rate relative to the ring core shaft,—the proper rate being such as brings about the desired relative surface speeds of the core and stretcher drum.

The ring cores which may be used with this machine, however, are of various diameters, according to the size of tire casing to be made. With changes in the size of the ring core, there must be a change in this train of gearing which drives the stretcher drum, if the latter is not changed. It is for this reason that the gear 47 is made to be easily taken off and another one supplied in its place. In order that these changeable gears of various sizes may all mesh with the big intermediate gear 50, this latter gear is mounted in the end of an arm 51 which swings about the axis of the stretcher drum. However much this arm may be swung, therefore, the intermediate gear 50 and the gear 48 on the stretcher drum shaft will always remain in mesh; and by swinging the arm to the required position, the gear 50 will mesh with gear 47, whatever may be the size of the latter. The axis of the intermediate gear 50 is below the plane connecting the axes of the tension roll shaft and the ring core shaft, and therefore, by raising or lowering this axis as through swinging the supporting arm 51, the position of the intermediate gear is such that it may always be made to mesh with any sized change gear 47. The swinging of the supporting arm to produce this meshing is produced by means of a screw 53 suitably mounted and having a hand wheel 54 at one end, a nut 55 mounted upon this screw, and a link 56 connecting this nut with the arm 51. A bolt through the shaft on which the intermediate gear is mounted engages in a segmental guide slot 57 in a fixed member 58, to lock the gear in position.

We prefer to change the gearing rather than substitute a stretcher drum of a different diameter, as this plan on the whole is simpler and cheaper. Of course if any one machine is constantly kept on one size of tire, no changes of gearing or stretcher-drum need be made.

The ring core must be removable from the shaft for reasons which are well understood in this art. The ring core, as shown, is a spokeless ring having in its inner periphery a groove 1ª.

A disk 60 is fixed to the ring core shaft 2, and is provided with radial guideways for movable blocks 61, each of which carries a removable and replaceable spoke member 62, whose outer end is adapted to engage in the groove 1ª in the inner periphery of the ring core. Each of these blocks has a threaded hole for the reception of a screw 63 rotatably mounted in a flange 64 of the disk 60, said screw having fixed to its inner end a beveled gear 65. These beveled gears 65 all engage a beveled gear 66 rotatably mounted on the ring core shaft. This beveled gear 66 has also a peripheral gear 67 which engages a pinion 68 fixed to a rotatable shaft 69 mounted on the disk, the outer end of this shaft having a squared end for the reception of a key by which it may be turned. In order to remove a ring core from this support this last named shaft 69 is turned by a suitable key whereby all of the screws 63 are turned and all of the blocks 61 are drawn inward and thereby the ring core is released. When a new ring core is put on, the movement of the parts is reversed. To adapt this construction for ring cores of various diameters the spoke members 62 may be easily removed and replaced by other spoke members of different suitable lengths.

The former 17 which has been previously mentioned includes, in the form shown, an arm which is loosely hung on a horizontal cylindrical bar 70 which is parallel with the core shaft. This arm may be moved along this bar when required to disengage it from the ring core. The free end of this arm is in the form of an arch or inverted U, which approximately corresponds with the shape of the outer surface of the ring core near which it lies. A concave roller 170 is mounted in this arm and is adapted to rest and roll on the ring core, or the partly completed tire casing thereon. No claim is made to the exclusive use of a roller in this connection. This accurately fixes the position of the arm relative to the ring core, whatever may be the diameter of the ring core in the machine. This former lies between the stretcher drum and the ring core, so that the fabric strip 15 in passing from one to the other must pass over it. It carries two longitudinally separated, successively-acting narrow convex surfaces with which this fabric engages, so as to initiate the inward bending of the edges of the fabric. One of these convex surfaces is a U shaped bar 71 fixed to the sides of the arm, and the other is the U shaped edge 72 of the end of the former.

We do not claim broadly the use of a fabric-shaping former in this connection, but by using the two separated convex surfaces in place of a single, elongated curved surface, we find it somewhat easier to give the former its proper configuration.

As has been previously stated, ring cores of different sizes may be used in this machine. In order that this one former may be adapted for use with any ring core, it is provided with a plurality of holes, any one of which may embrace the bar 70, thereby raising or lowering the pivoted end of the bar, and so enabling the free end of the bar to assume practically the same position with respect to any ring core, whatever may be its size. When a tire casing has been completed and the ring core is to be taken from the machine, this former may be swung up so as to free itself from the ring core and may then be moved along the bar laterally from the plane of the core so as not to interfere with the removal of said ring core and the putting of another on in its place.

The continuous strip may have a central line drawn on its top surface extending from end to end for coöperation with two pointers 74, 75. These pointers are respectively fixed to collars 76, 77 which loosely embrace rods 78, 79. These rods are adjustable horizontally in clamps 80, 81, which clamps are adjustable vertically upon standards 82, 83. This enables the pointers to be adjusted on the central line through the core and at a height corresponding to the diameter of the core being used.

In the operation of the machine as described, when two or three, more or less, completed plies of the fabric have been wound upon the ring core, it is desirable to apply beads to the sides of the partly completed casing. The machine shown contains mechanism which we will describe through which this application of the beads is facilitated, but we do not herein claim the said mechanism and may apply the beads by hand with the aid of suitable tools or devices not connected with the machine. A bracket arm 85 is so connected with one of the frame members 86 that it may be moved vertically thereon. The vertical position of this bracket arm is determined by a screw 87 having a stepped bearing 88 at its lower end and screwing into a threaded opening in the bracket. This bracket is provided with a horizontal cylindrical arm 89, on which a block 90 is rotatably mounted. To this block are pivoted two arms 91, 92, on the ends of which two freely rotatable guide sheaves 93 are mounted. When these arms are in the required operative position, they lie on opposite sides of the ring core, and one flange of each guide pulley engages the adjacent sides of the partly finished casing. A rod 97 which is pivoted to one of these arms goes through a slot 94 in the other arm, and has a threaded free end. A nut 95 screws onto this end and thereby compresses a spring 96 which embraces the rod 97 and lies between this nut and the washer 98 thereon, which washer engages with the arm 92. This spring, when so compressed, tends, therefore, to draw the two arms toward each other. The ends of the bead strips 100 are stuck to the sides of the partly completed tire casing, and held against them by the sheaves 93, so that as the ring core rotates, it will draw them along with it, and these guide sheaves will keep it in proper relation to the partly finished casing and will press the beads against the same. When the beads have been applied, it is desirable to take away these guide rolls. To do this, the nut 95 is unscrewed so as to take the tension from the spring 96, whereupon another spring 99 interposed between the two arms swings them apart until each rests against the pins 101. When they are in this position, the block may be turned down on arm 89 so that all of the bead guiding apparatus is wholly below and out of the way of the ring core.

It will be understood that as the continuous strip of fabric is stretched and wound upon the ring core, workmen stationed by the side of the ring core are using suitable tools (such, for example, as are in common use where workmen make tires by hand) and will stitch the sides of the strip down upon the core, or upon the previously applied plies or layers. As the beads are being applied, these same workmen will stitch the sides of the strip over these beads as well. When the entire strip has been applied the clutch will be thrown so as to connect the ring core shaft with the driving pulley through the chain of mechanism by which the ring core shaft may be rapidly revolved. When this is being done, the workmen with their tools will finally finish the casing in so far as it is intended to be finished in this machine. The application of the rubber tread, side strips, etc. to complete the casing as prepared in the machine, may be done by the workmen before removing the core from the machine; but it is found desirable to transfer the core to a hand worker's stand for these operations. When the machine has done its work, the operator, through the mechanism which has been described, will disconnect the ring core, taking it out of the machine, and substitute another in its place, after which the described operations will be repeated.

The positive gearing together with the core-shaft and stretcher-drum shaft produces an absolutely uniform elongation of the middle part of each ply of the fabric strip. With bias-cut fabric such as is used in tire manufacture, the stretching results in a change in the angle of the diagonally-running warp and weft threads, and if this stretching is not uniformly done, some threads in the completed tire will be subjected to more strain than others, so that the ability of the tire to withstand rupture is lessened. It has heretofore been proposed, in machines of this class, to apply a friction brake to the shaft of the stretcher drum, but a device of that character working alone is very unsatisfactory, as it operates irregularly, it affords no means for obtaining an exact amount of stretch in the fabric, the amount of stretch imparted varies with the condition of the fabric and if the machine should be stopped and started again, during the stretching operation, the amount of stretch imparted on restarting is practically double the usual amount on account of the permanent set acquired by the rubber friction on the fabric while standing still. These difficulties are overcome by means of our invention. We do not claim broadly the interposition of reduction gearing between the stretcher-drum and core for the purpose of stretching the tire-fabric uniformly, irrespective of whether or not such gearing operates with frictional contact on the surface of the core or on the laid plies, but we claim an advantage in positively gearing together the shafts of said drum and core, as this eliminates all chances of relative slip between the two. While such gearing increases the stretch of the outer plies by a small percentage over that of the inner ones, owing to the increased diameter of the successive layers, this difference has been found in practice to be negligible so far as any bad effects on the life of the tire are concerned, and may even afford some slight advantages, which however we consider it unnecessary to discuss in view of the beneficial results already alluded to.

Having described out invention, we claim:

1. In a tire-making machine, the combination of a rotatable core shaft, a core thereon having a rounded cross-section for making an open-sided tire carcass, a stretcher-drum having a shaft, and positive reduction gearing connecting said shafts and causing the stretcher drum to rotate at a lower peripheral speed than that of the core, so as to impart a predetermined amount of stretch to the middle of the fabric as it passes onto said core.

2. In a tire-making machine, the combination of a core-shaft, a tire-making core of rounded cross-section removably mounted thereon, a stretcher drum having a shaft, and a positive gear-train connecting said shafts for rotating the drum at a slower peripheral speed than that of the core, said gear train including a gear replaceable by one of a different diameter, and means for adjusting the mating gear to said replaceable gear.

3. In a machine for making tire casings, the combination of a rotatable core, a stretcher drum, means for turning said core and drum at different surface speeds, and a former over which the fabric strip is drawn in passing from the stretcher drum to the core, said former having two longitudinally-separated, transversely-arched surfaces with which said fabric strip successively engages.

4. In a machine for making tire casings, the combination of a core shaft, a tire-forming core removably mounted thereon, means for leading a fabric strip onto said core, and means for driving said core at different speeds, said means including a driving member, two sets of gearing and clutch mechanism for connecting the driving member with the core shaft, and an automatically-releasing clutch included in one of said sets of gearing for automatically disconnecting the core-shaft therefrom when the other set of gearing is thrown into action.

5. In a machine for making tire casings, the combination of a core shaft, a stretcher drum, a freely rotatable reel for holding a tire-making fabric strip and a liner strip, a reel for winding up the liner strip, slippable mechanism for turning said liner reel, and guide members over which the liner strip passes, so disposed that said liner strip is separated from the fabric strip and then carried again into contact with a part of the latter.

6. In a machine for making tire casings, the combination of a core shaft, a stretcher drum, a freely rotatable reel for holding a tire-making fabric strip and a liner strip, a reel for winding up the liner strip, slippable mechanism for turning said liner reel, a fixed guide bar for the liner strip located out of a direct line between the reel and the stretcher drum, and a swinging frame having a guide bar adjacent to the stretcher drum, whereby the liner strip in passing from the first-named guide bar to the liner reel will contact with a part of the fabric strip upon the stretcher drum.

7. In a tire-making machine, the combination of a rotatable core, fabric retarding means, and a former over which the fabric passes onto said core, said former being withdrawable from the core in the plane of the latter and also laterally to remove it from said plane.

8. In a tire-making machine, the combination of a rotatable core, fabric retarding means, a rod parallel to the axis of rotation of said core, and a fabric former pivoted on said rod, and also slidable therealong into and out of the plane of the core.

In testimony whereof, we hereunto affix our signatures in the presence of two witnesses.

FRANCIS B. CONVERSE.
FREDERICK A. KRESS.

Witnesses:
CHAS. C. MARTIN,
W. R. DENMAN.